United States Patent
Clingerman et al.

(10) Patent No.: US 8,088,529 B2
(45) Date of Patent: Jan. 3, 2012

(54) REMEDIAL ACTION TO OPERATE A FUEL CELL SYSTEM WITH A FAILED BLEED MANIFOLD UNIT

(75) Inventors: Bruce J. Clingerman, Palmyra, NY (US); Patrick Frost, Rochester, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 635 days.

(21) Appl. No.: 12/262,849

(22) Filed: Oct. 31, 2008

(65) Prior Publication Data

US 2010/0112384 A1    May 6, 2010

(51) Int. Cl.
*H01M 8/04* (2006.01)
(52) U.S. Cl. .......................... 429/444; 429/443; 429/428
(58) Field of Classification Search .................. None
See application file for complete search history.

(56) References Cited

U.S. PATENT DOCUMENTS

2007/0082243 A1* 4/2007 Sparschuh et al. .............. 429/22
* cited by examiner

*Primary Examiner* — Cynthia Lee
(74) *Attorney, Agent, or Firm* — John A. Miller; Miller IP Group, PLC

(57) ABSTRACT

A system and method for providing an anode exhaust gas bleed in a fuel cell system. The system provides a normal anode side bleed using first and second bleed valves if the first and second bleed valves are not blocked and the temperature of first and second split sub-stacks is greater than a predetermined temperature, provides a continuous anode side bleed using the bleed valves if the bleed valves are not blocked and the temperature of the sub-stacks is less than the predetermined temperature, provides a normal center anode bleed through the drain valve if the first or second bleed valve is blocked and the temperature of the sub-stacks is above the predetermined temperature and provides a continuous center anode side bleed through the drain valve if the first or second bleed valve is blocked and the temperature of the sub-stacks is below the predetermined temperature.

16 Claims, 2 Drawing Sheets

REMEDIAL ACTION TO OPERATE A FUEL CELL SYSTEM WITH A FAILED BLEED MANIFOLD UNIT

BACKGROUND OF THE INVENTION

1. Field of the Invention

This invention relates generally to a system and method for performing an anode exhaust gas bleed to remove nitrogen from the anode side of a fuel cell stack and, more particularly, to a system and method for performing an anode exhaust gas bleed to remove nitrogen from the anode side of a fuel cell stack in the event that a bleed manifold unit (BMU) fails.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

An algorithm may be employed to provide an online estimation of the nitrogen concentration in the anode exhaust gas during stack operation to know when to trigger the anode exhaust gas bleed. The algorithm may track the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example 10%, it may trigger the bleed. The bleed is typically performed for a duration that allows multiple stack anode volumes to be bled, thus reducing the nitrogen concentration below the threshold.

Some fuel cell systems employ anode flow shifting where the fuel cell stack is split into sub-stacks and the anode reactant gas flows through the split sub-stacks in alternating directions. In these types of designs, a bleed manifold unit (BMU) may be provided that includes valves for providing the anode exhaust gas bleed. Because water is present in the anode exhaust gas, it is likely that the BMU will have water remaining in it at system shut-down regardless of what measures are taken to remove the water. This water may freeze if the outside ambient temperature is low enough for a long enough period of time. On the next start-up, an anode exhaust gas bleed may be required before the BMU is thawed out enough, where ice may block the flow in the BMU. In certain fuel cell system designs, a continuous anode exhaust bleed is performed during the start-up sequence because the fuel cell stack is particularly sensitive to nitrogen collected during that time.

For a split stack system, the typical location to provide the anode exhaust gas bleed is at the end of the stack flow. Therefore, two bleed values are used to provide the anode bleed depending on the flow direction. Because a BMU is often provided to accommodate this form of bleeding it is typically referred to as the BMU bleed method. However, a center bleed also can be used that bleeds the anode exhaust from a drain valve in a line joining the two sub-stacks. The center bleed is typically less efficient that an end flow or BMU bleed because of the larger size of the drain valve.

The location for the bleed is one characteristic and the frequency and duration of the bleed is another characteristic. For a frozen stack, the bleed valve should be opened as much as possible to avoid any localized water build-up. This is referred to as a continuous bleed and can be an inefficient method of bleeding because hydrogen is also lost during the anode exhaust gas bleed. Thus, the system should return to a normal bleed schedule once the system is warmed up. The normal bleed method should be providing the bleeds as infrequently as possible to maximize system efficiency, while still maintaining good stack operation. In this mode, the bleed valves can be closed a significant percentage of the time during operation.

SUMMARY OF THE INVENTION

In accordance with the teachings of the present invention, a system and method for providing an anode exhaust gas bleed in a fuel cell system is disclosed. The fuel cell system includes first and second split sub-stacks and a bleed manifold unit including a first bleed valve, a second bleed valve, an exhaust valve, a flow restriction and a pressure sensor across the flow restriction. The system also includes a drain valve in a connection line between the first and second split sub-stacks. A controller controls the first and second bleed valve and the drain valve for providing an anode side bleed from the first and second sub-stacks.

An algorithm determines whether the first or second bleed valve is blocked, generally with ice, and whether the temperature of the first or second split sub-stack is below a predetermined temperature. The controller provides a normal anode side bleed using the first and second bleed valves if the first and second bleed valves are not blocked and the temperature of the first and second split sub-stacks is greater than the predetermined temperature, provides a continuous anode side bleed using the first and second bleed valves if the first and second bleed valves are not blocked and the temperature of the first and second split sub-stacks is less than the predetermined temperature, provides a normal center anode bleed through the drain valve if the first or second bleed valve is blocked and the temperature of the first and second split sub-stacks is above the predetermined temperature and provides a continuous center anode side bleed through the drain valve if the first or second bleed valve is blocked and the temperature of the first and second split sub-stacks is below the predetermined temperature.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for providing an anode exhaust gas bleed in a fuel cell system in the event of a BMU failure is merely exemplary in nature, and is in no way intended to limit the invention or its applications or uses.

Figure 1:
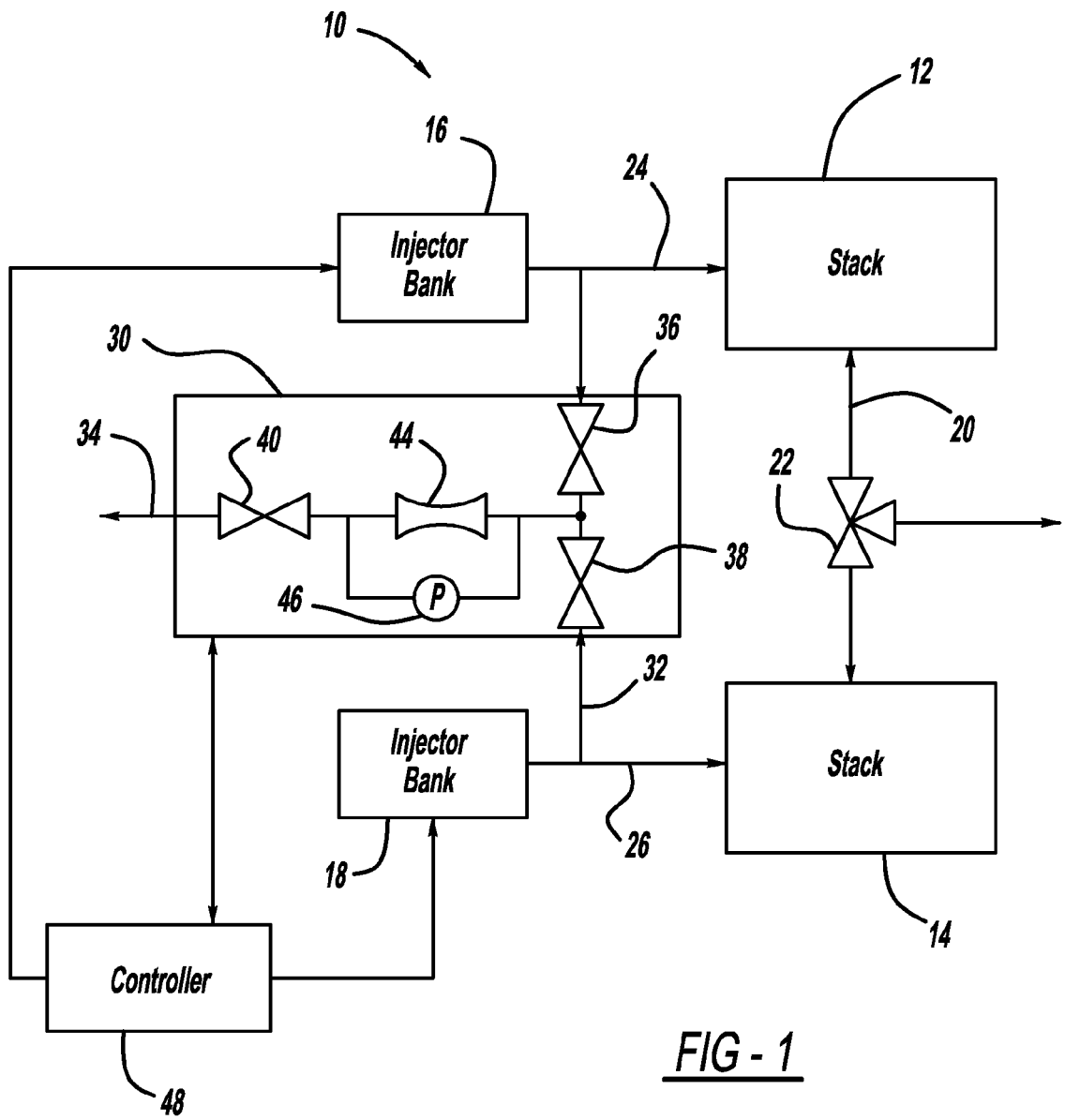
FIG. 1 is a block diagram of a fuel cell system employing split sub-stacks and a BMU.

FIG. 1 is a block diagram of a fuel cell system 10 including split fuel cell sub-stacks 12 and 14 that operate under anode flow shifting. When the flow is in one direction, an injector bank 16 injects fresh hydrogen into the anode side of the sub-stack 12 on anode input line 24. Anode gas that is output from the sub-stack 12 is sent to the sub-stack 14 on connecting line 20. When the flow is in the opposite direction, an injector bank 18 injects fresh hydrogen into the anode side of the sub-stack 14 on anode input line 26 that is output from the sub-stack 14 and sent to the sub-stack 12 on the line 20. A drain valve 22 is provided in the line 20 and can be used for a center bleed, as will be discussed in more detail below.

A BMU 30 is provided at an anode input to the split sub-stacks 12 and 14 and provides an anode exhaust gas bleed during certain times to remove nitrogen from the anode side of the sub-stacks 12 and 14 based on any suitable bleed schedule. The BMU 30 includes a line 32 that connects the anode input lines 24 and 26 and an exhaust line 34 that connects the line 32 to the exhaust of the system 10, typically the cathode side exhaust of the sub-stacks 12 and 14. A first bleed valve 36 is provided in the line 32 proximate to the sub-stack 12 and a second bleed valve 38 is provided in the line 32 proximate the sub-stack 14. An exhaust valve 40 is provided in the line 34 that is opened during the anode bleed and other times as may be required. A flow restriction 44 is provided in the line 34 to limit the amount of anode exhaust gas that can be bled into the environment.

A differential pressure sensor 46 is provided across the flow restriction 44, and measures a pressure difference across the flow restriction 44 to identify the flow rate through the flow restriction 44. When flow begins through the flow restriction 44, the pressure sensor 46 goes up from a zero value, or a near zero value, depending on the resolution of the sensor 46, to a pressure indicative of a proper flow through the flow restriction 44.

When the system 10 is operating under anode flow-shifting and no bleed is commanded, the bleed valves 36 and 38 are both closed, so that depending on the direction of the anode gas flow, the output of the second sub-stack is dead-ended. If a bleed is commanded, and the flow-shifting is in the direction from the sub-stack 12 to the sub-stack 14 through the line 20, then the bleed valve 38 is opened and the bleed valve 36 is closed. Likewise, if a bleed is commanded and the flow is in the direction from the sub-stack 14 to the sub-stack 12 through the line 20, then the first bleed valve 36 is opened and the second bleed valve 38 is closed. Thus, the anode exhaust gas is bled out of the exhaust line 34 through the flow restriction 44 and the exhaust valve 40.

A controller 48 controls the injector banks 16 and 18, controls the valves 36, 38 and 40 and receives a pressure reading signal from the pressure sensor 46.

As discussed above, the BMU 30 may collect water at various locations when the anode exhaust gas flow is flowing therethrough, and may retain water after the system 10 is shut-down. This water may freeze if the system 10 is in a cold enough environment for a long enough period of time. Thus, at the next system start-up water may have frozen in the BMU 30 at locations such as the bleed valves 36 and 38, the flow restriction 44, the exhaust valve 40 and the lines to the pressure sensor 46, which may block the flow of the anode exhaust gas when a bleed is desired.

Figure 2:
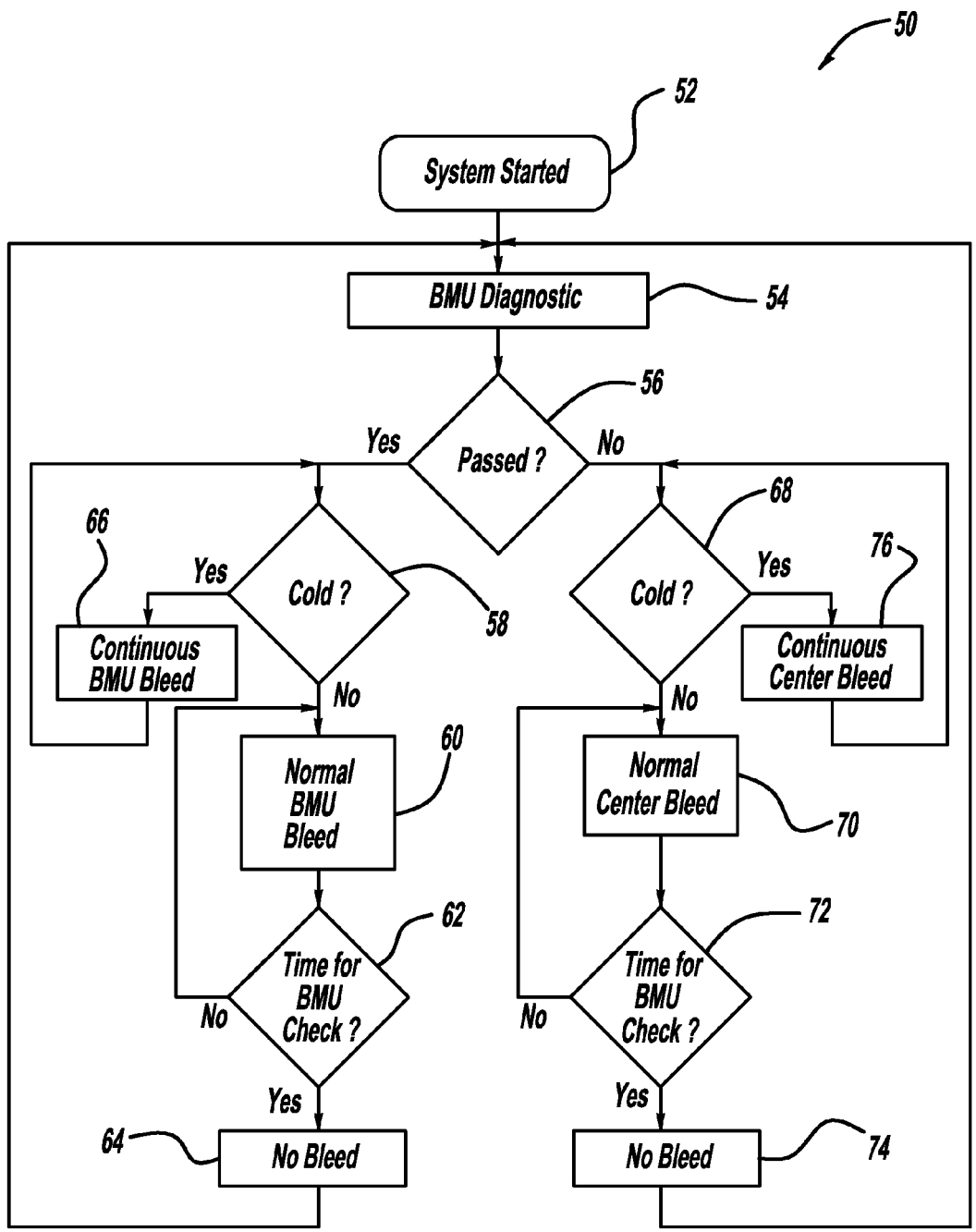
FIG. 2 is a flow chart diagram showing a process for providing a stack anode exhaust gas bleed in the event of a BMU failure.

The present invention proposes a method for providing a suitable anode exhaust gas bleed during those times when the BMU 30 is in a failure mode, such as from frozen water blocking flow, which may prevent a bleed through the BMU 30. FIG. 2 is a flow chart diagram 50 showing a process for providing an anode exhaust gas bleed that includes this consideration. When the system 10 is started at box 52 it will typically immediately perform a BMU diagnostics check at box 54 to determine whether the BMU 30 is operating properly. In certain systems, the BMU diagnostics check can take over five seconds to complete due to complexity. The first BMU diagnostics check should be done at start-up before nitrogen and water have a chance to build up in the sub-stacks 12 and 14. The BMU diagnostics check may perform a number of diagnostics on the BMU 30, including determining whether the BMU 30 is frozen or has failed.

To determine the complete function of the BMU 30, it can be tested at three stages. For a first stage, one of bleed valves 36 or 38 is opened depending on the anode flow direction and the exhaust valve 40 is opened. If the opened bleed valve 36 or 38 and the exhaust valve 40 allow flow to the system exhaust, then the pressure sensor 46 provides a pressure reading across the flow restriction 44. If the flow through the BMU 30 is unrestricted, then the pressure sensor 46 should provide a pressure reading that is about the same as the differential pressure between the cathode and anode of the spilt sub-stacks 12 and 14.

If a proper flow is detected at the first stage, then a second stage includes closing the exhaust valve 40 to determine if the pressure sensor 46 measures a zero or near zero level, and if it does, the flow restriction 44 is not blocked with ice. If the pressure sensor 46 does provide a high enough pressure reading, the flow restriction 44 or the lines from the pressure sensor 46 to the line 34 maybe restricted, such as by ice. If ice does block the passage downstream of the anode side to the pressure sensor 46, the flow detection seen in the first stage may actually be just the pressure difference between the anode side pressure and the cathode side pressure that existed if the line 34 was frozen. If only the first stage was used, the diagnostic would fail to detect ice in these parts of the BMU 30.

For the third stage of the diagnostics, the bleed valve that was opened in the first stage is closed and the bleed valve that was closed in the first stage is opened to determine whether it is blocked with ice. Particularly, if the bleed valve 36 was opened and the bleed valve 38 was closed during the first stage, the bleed valve 36 is closed and the bleed valve 38 is opened during the third stage, or vice versa. The exhaust valve 40 does not need to be closed because that function has already been tested in the second stage, although other variations of valve closure, such as closing all the valves as a final channel flow, can be included to simplify implementation within the framework of the existing anode flow shift and control. If all of the stages indicate flow, then the BMU 30 is operating properly with no flow restrictions and the BMU 30 passes the diagnostics check. If any of the stages indicate that the BMU 30 is not operating properly, then the system 10 can switch to a center bleed through the drain valve 22 to keep the sub-stacks 12 and 14 operational, or perform some other remedial action.

An algorithm operating in the system 10 determines whether the diagnostics check has passed at decision diamond 56. If the BMU diagnostics has passed at the decision diamond 56, then the algorithm determines whether it is cold enough at decision diamond 58 to be concerned about ice blocking the flow channels in the BMU 30, even though it may currently be operating properly. The algorithm can use any suitable technique to determine whether the environment is too cold, such as an ambient temperature reading, a stack temperature reading, a cooling fluid temperature reading, etc. The algorithm can employ any suitable temperature threshold for this determination, such as for example 50° C. If the system is not too cold at the decision diamond 58, then the algorithm uses the normal BMU bleed schedule employing the bleed valves 36 and 38 at box 60. Any suitable BMU bleed schedule can be employed based on the accumulation of nitrogen on the anode side of the split sub-stacks 12 and 14.

The algorithm then determines whether a predetermined time has expired where another BMU diagnostics check should be performed at decision diamond 62. The system may perform a BMU diagnostics check during normal operation to check for BMU flow that does not have anything to do with ice, but could be for other failures. If it is not time for the next BMU diagnostics check at the decision diamond 62, then the algorithm returns to providing a normal BMU bleed. If it is time for a BMU diagnostics check, the algorithm prevents the anode exhaust gas bleed at box 64 and returns to the box 54 to perform the BMU diagnostics check.

If the start-up temperature is cold enough at the decision diamond 58, it is possible that a no-flow condition could occur due to ice in the BMU 30. In this situation, the algorithm goes to a continuous BMU bleed at box 66 where one or the other of the bleed valves 36 or 38 is always opened depending on the flow direction through the sub-stacks 12 and 14.

If the diagnostics check fails at the decision diamond 56, the algorithm goes into the less desirable center bleed mode using the drain valve 22. Typically, the drain valve 22 is larger than the bleed valves 36 and 38, and thus the amount of hydrogen that is lost during a center bleed is significant. Further, when the drain valve 22 is used for a bleed, little, if any, of the anode exhaust during the flow shifting process is sent to the downstream split stack because most of it is exhausted out of the drain valve 22. It is possible to perform a parallel flow into both of the split stacks 12 and 14 at the same time during the center bleed. However, such an operation loses even more hydrogen.

The algorithm first determines whether it is too cold for a normal center bleed at decision diamond 68. If it is not too cold at the decision diamond 68, then the algorithm performs the normal center bleed at box 70 where the drain valve 22 is opened and closed on a desirable schedule based on the accumulation of nitrogen in the split sub-stacks 12 and 14. Periodically, the algorithm will determine whether it is time for a BMU diagnostics check at decision diamond 72, and if not, returns to the normal center bleed at the box 70. The BMU bleed diagnostic cannot be done during the center bleed operation because if the BMU 30 is working, the hydrogen flow from the center bleed and the BMU bleed can exceed hydrogen emissions limit, such as for example 4%. The center bleed is suspended temporarily at box 74 for the BMU diagnostics to be run. The time without the bleed could put stack operation at risk. Therefore, the center bleed is maintained and the BMU diagnostics is suspended until the system warms up to a temperature that does not need a continuous bleed, for example 40° C. If it is too cold at the decision diamond 68, then the algorithm performs a continuous center bleed through the drain valve 22 at box 76 until the temperature is high enough where ice will not be blocking the flow channels.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a first split sub-stack;
   a second split sub-stack;
   a connection line connecting the first split sub-stack to the second split sub-stack;
   a drain valve provided in the connection line;
   a first bleed valve connected to an input line to the first split sub-stack;
   a second bleed valve connected to an input to the second split sub-stack; and
   a controller for controlling the first and second bleed valves and the drain valve for providing an anode side bleed from the first and second split sub-stacks, said controller determining whether the first or second bleed valve is blocked and determining whether the temperature of the first or second split sub-stack is below a predetermined temperature, said controller providing a normal anode side bleed using the first and second bleed valves if the first and second bleed valves are not blocked and the temperature of the first and second split sub-stacks is greater than the predetermined temperature, providing a continuous anode side bleed using the first and second bleed valves if the first and second bleed valves are not blocked and the temperature of the first and second split sub-stacks is less than the predetermined temperature, providing a normal center anode side bleed through the drain valve if the first or second bleed valve is blocked and the temperature of the first and second split sub-stacks is above the predetermined temperature and provides a continuous center anode side bleed through the drain valve if the first or second bleed valve is blocked and the temperature of the first and second split sub-stacks is below the predetermined temperature.

2. The system according to claim 1 wherein the controller controls an anode flow to the first and second split sub-stacks to provide anode flow shifting where the first bleed valve is opened to provide the anode side bleed if the anode flow shift is from the second split stack to the first split stack and the second bleed valve is open to provide the anode side bleed if the flow shift is from the first split sub-stack to the second split sub-stack.

3. The system according to claim 1 wherein the first and second bleed valves are part of a bleed manifold unit.

4. The system according to claim 1 wherein the controller determines whether the first and second bleed valves are blocked with ice.

5. The system according to claim 1 wherein the predetermined temperature is about 50° C.

6. The system according to claim 1 wherein the controller performs a diagnostics check on the first and second bleed valve at periodic times during the normal anode side bleed and the normal center bleed.

7. The system according to claim 6 wherein the controller prevents an anode side bleed during the diagnostic check.

8. A fuel cell system comprising:
a first split sub-stack;
a second split sub-stack;
a connection line connecting the first split sub-stack to the second split sub-stack;
a drain valve provided in the connection line;
a bleed manifold unit (BMU) provided at the input of the first and second split sub-stack, said bleed manifold unit including a first bleed valve, a second bleed valve and an exhaust valve; and
a controller for controlling the first and second bleed valves and the drain valve for providing an anode side bleed from the first and second split sub-stacks, said controller determining whether the first or second bleed valve is blocked and determining whether the temperature of the first or second split sub-stack is below a predetermined temperature, said controller providing a normal anode side bleed using the first and second bleed valves if the first and second bleed valves are not blocked and the temperature of the first and second split sub-stacks is greater than the predetermined temperature, providing a continuous anode side bleed using the first and second bleed valves if the first and second bleed valves are not blocked and the temperature of the first and second split sub-stacks is less than the predetermined temperature, providing a normal center anode side bleed through the drain valve if the first or second bleed valve is blocked and the temperature of the first and second split sub-stacks is above the predetermined temperature and provides a continuous center anode side bleed through the drain valve if the first or second bleed valve is blocked and the temperature of the first and second split sub-stacks is below the predetermined temperature.

9. The system according to claim 8 wherein the controller determines whether the first and second bleed valves are blocked with ice.

10. The system according to claim 8 wherein the predetermined temperature is about 50° C.

11. The system according to claim 8 wherein the controller performs a diagnostics check on the first and second bleed valve at periodic times during the normal anode side bleed and the normal center bleed.

12. A method for providing an anode side bleed from a fuel cell system including first and second split sub-stacks, first and second bleed valves and a drain valve provided in a connection line between a first and second split sub-stacks, said first and second split sub-stacks operating under anode flow shifting, said method comprising:
determining whether the first or second bleed valve is blocked;
determining whether the temperature of the first or second split sub-stack is below a predetermined temperature;
providing a normal anode side bleed using the first and second bleed valves if the first and second bleed valves are not blocked and the temperature of the first and second split sub-stacks is greater than the predetermined temperature;
providing a continuous anode side bleed using the first and second bleed valves if the first and second bleed valves are not blocked and the temperature of the first and second split sub-stacks is less than the predetermined temperature;
providing a normal center anode side bleed through the drain valve if the first or second bleed valve is blocked and the temperature of the first and second split sub-stacks is above the predetermined temperature; and
providing a continuous center anode side bleed through the drain valve if the first or second bleed valve is blocked and the temperature of the first and second split sub-stacks is below the predetermined temperature.

13. The method according to claim 12 wherein the first and second bleed valves are part of a bleed manifold unit.

14. The method according to claim 12 further comprising determining whether the first and second bleed valves are blocked with ice.

15. The method according to claim 12 wherein the predetermined temperature is about 50° C.

16. The method according to claim 12 further comprising performing a diagnostics check on the first and second bleed valve at periodic times during the normal anode side bleed and the normal center bleed.

* * * * *